3,248,348
POLYURETHANE FOAM PREPARED FROM A
TALL OIL ESTER
Helmut Piechota and Hans Wirtz, Leverkusen, Germany, assignors to Farbenfabriken Bayer Aktiengesellschaft, Leverkusen, Germany, a German corporation
No Drawing. Filed May 3, 1962, Ser. No. 192,046
Claims priority, application Germany, May 6, 1961,
F 33,877
1 Claim. (Cl. 260—2.5)

This invention relates to polyurethane foam and more particularly, to an improved polyurethane foam based on low cost raw materials which nevertheless have improved physical properties, and especially flame-resistance.

The production of polyurethane foam from various types of active hydrogen containing compounds including polyesters, polyethers and the like by reaction thereof with an organic polyisocyanate in the presence of a blowing agent as well as other additives including activators, emulsifiers and the like is well known. One drawback in the production of polyurethane foam is that most of the materials which will impart flame-resistance to the final product are difficult to mix with the organic polyisocyanate because they are highly viscous materials at room temperature. This is especially true of the halogenated polyesters such as, for example, those based on tetrachlorophthalic acid, dibromophthalic acid and the like. The polyesters which do not contain halogen are of the right consistency for the prepartion of foamed plastics but do not have satisfactory flame-resistance and are moreover very expensive raw materials. The polyhydric polyalkylene ethers are more economical for the production of cellular polyurethane plastics but require particular additives, catalysts and the like in order to produce a satisfactory foam material.

It is therefore an object of this invention to provide polyurethane foam and an ester for the production thereof which is substantially devoid of the foregoing disadvantages. Another object of this invention is to provide an improved ester for the production of polyurethane foam. Still a further object of this invention is to provide an improved flame-resistant polyurethane foam based on certain components which are relatively easy to mix together to bring about the production of a foamed polyurethane plastic. A further object of this invention is to provide a halogenated ester and polyurethane foam obtained therefrom which has improved physical properties.

The foregoing objects and others which will become apparent from the following description are accomplished in accordance with the invention, generally speaking, by providing polyurethane foam prepared from an organic polyisocyanate and a tall oil ester having terminal hydroxyl groups in the presence of a blowing agent. The tall oil esters contemplated by the invention are prepared by reacting the mixture of acids including fatty acids and rosin acids obtained as a py-product in the manufacture of cellulose from pine wood with a polyhydric alcohol or amino alcohol to prepare a product having terminal hydroxyl groups. The resulting ester is then reacted with an organic polyisocyanate either alone or in conjunction with other organic compounds containing active hydrogen containing groups as determined by the Zerewitinoff method in the presence of a blowing agent to prepare the polyurethane foams of the invention.

In accordance with a preferred embodiment of the invention, the tall oil esters are modfied with a halogen and preferably bromine or chlorine so that an ester is obtained which has good processing characteristics including relatively low viscosity to produce a polyurethane foam which is less brittle than the heretobefore known polyurethane foams prepared from halogenated esters. It is preferred that the halogenated tall oil contain from about 5 percent to about 30 percent halogen and the most preferred range is from about 20 percent to about 30 percent by weight halogen in the ester product.

As stated apove, the term "tall oil" as used herein and in the claims designates the resinous substance obtained as an oily natural product in the manufacture of cellulose from pine wood. The composition of tall oil and its properties are preferaply within approximately the following ranges:

| | |
|---|---|
| Density | 0.95–1.02 |
| Acid number | 107–180 |
| Ash, percent | 0.4–4.6 |
| Moisture, percent | 0.39–1.0 |
| Constituents insoluble in petroleum ether, percent | 0.1–8.5 |
| Fatty acids, percent | 18–70 |
| Resin acids, percent | 10–80 |
| Non-acid portions, percent | 5–24 |
| Viscosity at 180° C., cp. | 20–1500 |

The fatty acids present in the tall oil are mainly oleic acid, linoleic acid and linolenic acid and the resin acid is mainly abietic acid.

The tall oil is modfied in accordance with the invention by reaction of the carboxylic acid groups of the tall oil with the hydroxyl or amino groups of the polyhydric alcohol and/or amino alcohol. Any suitable polyhydric alcohol may be used but it is preferred to use those which contain at least three hydroxyl groups so that the polyester obtained after reaction of the tall oil therewith has at least two free hydroxyl groups. Suitable polyhydric alcohols are therefore diethylene glycol, triethylene glycol, 1,2-propylene glycol, 1,3-propylene glycol, 1,4-butylene glycol, glycerine, trimethylolpropane, 1,3,6-hexane triol, 1,2,6-hexane triol, pentaerythritol, sorbitol, and the like as well as the alkylene oxide reaction products of these such as, for example, the reaction product of alkylene oxide, propylene oxide, butylene oxide, styrene oxide, epichlorohydrin or the like with any one of the above. A particularly good alkylene oxide condensate is the proplyene oxide condensate of glycerine which has a molecular weight of about 1,000. It is also possible to use amino alcohols such as ethanol amine and the like which contain only one amino group and one hydroxyl group but amino polyhydric alcohols may also be used such as, for example, diethanol amine, triethanol amine, the reaction product of propylene oxide with toluylene diamine and the like. When the amino alcohols are used which have primary amino groups, then the resulting reaction product with tall oil is an ester amide which is, of course, included within the term "esters" used above. The carboxyl groups of the tall oil may also be converted to polyalkylene glycol esters by reaction with alkylene oxides such as, for example, ethylene oxide, propylene oxide, butylene oxide, styrene oxide, epichlorohydrin and the like or tetrahydrofuran. In this case, branching may be introduced by mixing the resulting product with glycerol, trimethylolpropane, pentaerythritol and the like.

An important feature of the invention as pointed out above is the use of halogenated esters based on tall oil. The halogen is preferably chlorine or bromine and may be introduced at any stage in the production of the tall oil ester. Thus, for example, the tall oil may be modified by reaction with the halogen before esterification with the alcohol or amino alcohol. Halogenation, however, is preferably carried out by treating the ester of tall oil with halogen at a temperature between about 30° C. and about 200° C. and most preferably between about 50° C. and about 100° C. The halogen may be added all at once or dropwise. Both the halogen and the tall oil ester may be used either pure or in solution. If a solution is used, carbon tetrachloride or any other organic solvent is suitable. After the halogenation has reached the desired stage, i.e., so that the tall oil ester contains from 5 to 30 percent by weight of halogen, then the traces of hydrogen halide, and if desired the solvent, may be removed by subjecting the reaction mixture to a vacuum preferably from about 30 minutes to about two hours. The halogen adds to the unsaturation in the tall oil and unexpectedly does not unsatisfactorily increase the viscosity of the product. However, the halogenation of the tall oil is preferably adjusted to a level below about 30 percent by weight of the halogen so that the viscosity will not be too high for satisfactory processing characteristics. A preferred product is one containing about 20 percent by weight of bromine which was obtained by reacting tall oil having an acid number of from about 150 to about 180 with a mixture of a dihydric alcohol and a trihydric alcohol such as diethylene glycol and trimethylolpropane until a product having an hydroxyl number above about 200 and an acid number below about 5 is obtained.

It is preferred that the tall oil esters have a molecular weight of from about 500 to about 10,000 and most preferably of from about 1,000 to about 5,000 with hydroxyl numbers within the range of from about 25 to about 800. The acid number may vary over a wide range but is preferably below about 30 and most preferably below about 5.

Any suitable organic compound containing at least two active hydrogen containing groups as determined by the Zerewitinoff method, said groups being reactive with an isocyanate group, may be reacted with an organic polyisocyanate in the presence of tall oil esters in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and tall oil ester can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3, 6-hexane triol, triethanol amine, pentaerythritol, sorbitol and the like.

Any suitable polyhydric polyalkylene ether may be used such as, for example, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257 to 262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

In addition, there may be mentioned the use of diamines such as ethylene diamine and the like or amino carboxylic acids such as alanine for the production of the polyester amides or one may modify the polyesters with saturated or unsaturated fatty acids or fatty alcohols such as, for example, stearic acid, palmitic acid, lauryl alcohol or the like. Furthermore, the polyhydric polyalkylene ethers may be made by adding the alkylene oxides disclosed above to amino alcohols such as ethanol amine, diethanol amine, triethanol amine or the like or amines such as aniline, or alkylene diamines such as ethylene diamine, tetramethylene diamine, hexamethylene diamine and the like. Moreover, the above named alkylene oxides may be reacted with castor oil to produce a polyol suitable for mixture with the tall oil esters of the invention.

In accordance with still another preferred embodiment of the invention, the tall oil esters may be mixed with a flame-resisting amount of the reaction product of phosphoric acid and/or phosphorous acids with alkylene oxides or alkylene glycols to obtain a synergistic flame-resisting action. Suitable alkylene oxide or alkylene glycol addition products of phosphoric or phosphorous acids may be illustrated by the following formulas:

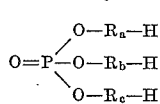

and/or

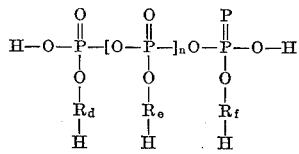

wherein $a$, $b$, $c$, $d$, $e$ and $f$ are numbers from 1 to 35, $n$ is a number between 0 and 20 and R is an alkoxy group which may be the same or different. Any suitable alkoxy group may be R in the foregoing formula such as that obtained by removing the hydroxyl group from ethylene glycol, 1,2-propylene glycol, 1,3-propylene glycol, 1,4-butane diol or the like. It is preferred that the alkoxy radicals represented by R in the foregoing formula contain 2 to 4 carbon atoms separating oxygen ether linkages.

Any suitable organic polyisocyanate may be used such as, for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, n-Butylene diisocyanate,
Hexamethylene diisocyanate,
m-Xylylene diisocyanate,
p-Xylylene diisocyanate,
4,4-dimethyl-1,3-xylylene diisocyanate,
Cyclohexyl-1,4-diisocyanate,
Dicyclohexylmethane-4,4'-diisocyanate,
m-Phenylene diisocyanate,
p-Phenylene diisocyanate,
3-(alpha-isocyanatoethyl)-phenylisocyanate,
2,6-diethylbenzene-1,4-diisocyanate,
Diphenyl-dimethylmethane-4,4'-diisocyanate,
Ethylene diisocyanate,
Ethylidene diisocyanate,
Propylene-1,2-diisocyanate,
Cyclohexylene-1,2-diisocyanate,
m-Phenylene diisocyanate,
2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
p,p',p''-triphenylmethane triisocyanate,
1,5-naphthylene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthylene diisocyanate, p,p',p''-triisocyanato phenyl phosphate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate. The isocyanates may be used in refined or crude form such as crude toluylene diisocyanates as are obtained by the phosgenation of a mixture of toluylene diamines or crude diphenylmethane isocyanates such as those obtained by the phosgenation of crude diphenylmethane diamine.

The polyurethane foam is prepared in accordance with heretofore known procedures by simply combining the organic polyisocyanate with the tall oil ester and mixtures thereof with a different active hydrogen containing compound in the presence of a blowing agent. The blowing agent may be water which reacts with the isocyanate to produce carbon dioxide or the blowing agent may be one having a boiling point in the proper range so that it blows the polymer into a foam as the polymerization reaction proceeds. Suitable blowing agents of the latter type are halohydrocarbons such as, for example, a dichlorodifluoromethane, trichlorofluoromethane or the like. The tall oil ester may be combined with the polyisocyanate prior to introduction of the blowing agent so that a prepolymer having free —NCO groups is formed and alternately the three essential components, namely the tall oil ester, the organic polyisocyanate and the blowing agent, may be combined substantially simultaneously in one step.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

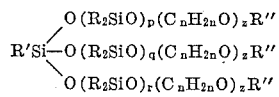

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

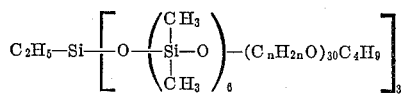

wherein ($C_nH_{2n}O$) is mixed polyoxyethylene and oxypropylene block copolymer containing about 17 oxyethylene units and about 13 oxypropylene units.

It is preferred to use a catalyst in the preparation of the polyurethane foam of the invention. Suitable catalysts are, for example, tertiary amines, such as, for example, triethylene diamine, N-methyl morpholine, N-ethyl morpholine, diethyl ethanolamine, n-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like. Other suitable catalysts are, for example, tin compounds such as stannous chloride, tin salts of carboxylic acids, such as dibutyl tin die-2-ethyl hexoate, stannous octoate, stannous oleate, as well as other organo metallic compounds such as are disclosed in U.S. Patent 2,846,408.

The special advantage of the modified tall oil for the manufacture of foam plastics which contain urethane groups lies in its low viscosity. This makes it possible to work without loss of material by introducing dosed quantities in an apparatus provided with piston pumps, so that it is possible to keep to a prescription quite accurately. The foam plastics obtained are therefore very uniform in composition without the formation of cavities and they are very tough. The mechanical properties are also remarkably good and the contour stability at high (150° C.) and low (—40° C.) temperatures is excellent.

The polyurethane foam of the invention is useful for the production of various articles of commerce including foamed insulation such as sound and thermal insulation in the production of wall panels and the like. Moreover, the flexible plastics of the invention may be used for the preparation of cushions, air filters and the like.

The invention is further illustrated by the following examples in which the parts are by weight unless otherwise specified.

*Example 1*

(A) About 648 parts of distilled tall oil (acid number about 173, viscosity about 34 cp./25° C.) are mixed with about 212 parts of diethylene glycol and about 268 parts of trimethylolpropane and heated with stirring to about 220° C. When most of the water has distilled off, the remainder is removed in a water-jet vacuum at about 230° C. The reaction is completed after about 14 hours. The —OH number is about 485, the acid number about 5, viscosity about 60 cp./25°.

(B) About 100 parts of the modified tall oil of Example 1(A) are intensively mixed with about 0.3 part of polysiloxane polyalkylene glycol ester having the formula

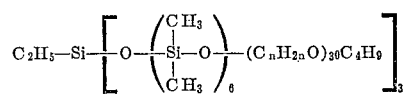

wherein ($C_nH_{2n}O$) is a mixed polyoxyethylene and oxypropylene block copolymer containing about 17 oxyethylene units and about 13 oxypropylene units, about 2 parts of N-methyl-N' - (N - dimethylaminoethyl) - piperazine, about 8 parts sulphonated castor oil (50 percent water content) and about 134 parts diphenylmethane-4,4'-diisocyanate. The foam plastic formed from the liquid mixture has a density of about 40 kg./m.³ and excellent heat resistance.

*Example 2*

About 70 parts of the modified tall oil of Example 1(A) are mixed with about 30 parts of tetrakis (hydroxypropyl) ethylene diamine, about 0.3 part of the polysiloxane polyalkylene glycol ester of Example 1(B) and about 30 parts of trichloromonofluoromethane. To this is added with intensive stirring about 104 parts of diphenylmethane-4,4'-diisocyanate. The product obtained is a foam plastic having a density of about 35 kg./m.³ and excellent contour stability within the limits of about —40° C. to about 120° C.

*Example 3*

(A) About 648 parts of distilled tall oil are mixed with about 210 parts of diethylene glycol and about 92 parts of glycerol as described in Example 1(A). The —OH number of the resulting polyester is about 335, the acid number is about 0.5.

(B) About 50 parts of the resulting tall oil ester are mixed with intensive stirring with about 50 parts of propoxylated ethylene diamine of Example 2, about 0.6 part of the polysiloxane polyalkylene glycol ester of Example 1(B), about 50 parts of trichloromonofluoromethane and about 144 parts of 4,4'-diphenylmethane diisocyanate. The product is a foam plastic having a density of about 25 kg./m.³ and good mechanical properties.

*Example 4*

(A) About 450 parts of bromine are added drop by drop while stirring to 1000 parts of modified tall oil (—OH number about 361, acid number about 5) prepared by the procedure of Example 1(A) using tall oil, diethylene glycol and glycerine. The temperature is kept at about 50° C. by cooling. Under these conditions, the bromine added is taken up spontaneously. To remove volatile constituents, the dark brown bromine addition product is first subjected to a vacuum of about 14 mm. Hg at about 50° C. for about one hour. The product is then treated at the same pressure and at about 70° C. in a thin layer evaporator. A dark brown oil containing about 30 percent bromine is obtained. It has approximately the following properties:

Acid number _____ 24.5
—OH number _____ 215
Viscosity, cp./25° C. _____ 430

(B) About 50 parts of the brominated modified tall oil obtained in Example 4(A) are intimately mixed with stirring with about 20 parts of phosphoric acid polypropylene glycol ester (—OH number about 380), about 30 parts of the propoxylated ethylene diamine of Example 2, about 0.5 part of permethylated triethylene diamine, about 0.5 part of N-methyl-N'-(N,N-dimethylaminoethyl)-piperazine, about 0.1 part of dibutyl tin dilaurate, about 0.5 part of the polysiloxane polyalkylene glycol ester of Example 1(B) and about 50 parts of trichloromonofluoromethane. To this is added with stirring about 114 parts of a crude diphenylmethane-4,4'-diisocyanate obtained by phosgenating the reaction product of aniline with formaldehyde and containing about 32 percent free —NCO and having an amine equivalent of about 140. The foam plastic obtained from the liquid reaction mixture has a density of about 40 kg./m.³ and has excellent flame-resistance.

*Example 5*

About 50 parts of the brominated modified tall oil of Example 4(A) are thoroughly mixed with about 20 parts of phosphoric acid polypropylene glycol ester of Example 4(B), about 30 parts of propoxylated ethylene diamine of Example 2, about 1.0 part of N-methyl-N'-(N,N-dimethylaminoethyl)-piperazine, about 1.0 part of permethylated diethylene triamine, about 0.1 part of dibutyl tin dilaurate, about 0.5 part of the polysiloxane polyalkylene glycol ester of Example 1(B) and about 6.0 parts of sulphonated castor oil (sodium salt, water content 50 percent). To this is added while stirring rapidly about 164 parts of diphenylmethane-4,4'-diisocyanate. The foam plastic obtained from the liquid mixture has a density of about 35 kg./m.³ and has good flame-resistance.

Example 6

About 60 parts of the brominated modified tall oil of Example 4(A) are thoroughly mixed with about 40 parts of the propoxylated ethylene diamine of Example 2, about 0.5 part of the polysiloxane polyalkylene glycol ester of Example 1(B) and about 30 parts of trichloromonofluoromethane. To this is added while stirring rapidly about 120 parts of the crude diphenylmethane-4,4'-diisocyanate of Example 4(B). From this mixture is obtained a foam plastic having a density of about 34 kg./m.³ with good flame-resistance.

It is to be understood that the foregoing working examples are given for the purpose of illustration and that they may be modified in accordance with the disclosure to employ other suitable tall oil esters, organic polyisocyanates, blowing agents and the like.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

A polyurethane foam obtained by a process which comprises reacting, in the presence of a blowing agent, an organic polyisocyanate with a tall oil ester prepared by a process which comprises reacting tall oil with a polyhydric alcohol and a compound having the formula

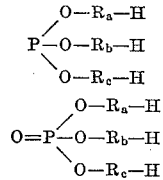

or

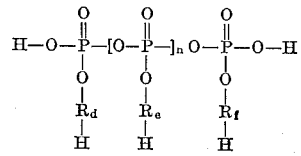

wherein $a$, $b$, $c$, $d$, $e$ and $f$ are numbers from 1 to 35, $n$ is a number between 0 and 20 and R is an alkoxy group.

References Cited by the Examiner

UNITED STATES PATENTS

| | | | |
|---|---|---|---|
| 2,812,337 | 11/1957 | Culemeyer | 260—404 |
| 2,970,062 | 1/1961 | Hauge et al. | 106—123 |
| 3,047,540 | 7/1962 | Merten et al. | 260—2.5 |
| 3,095,386 | 6/1963 | Hudson | 260—2.5 |

LEON J. BERCOVITZ, *Primary Examiner.*